(12) United States Patent
Gregory et al.

(10) Patent No.: US 8,898,237 B1
(45) Date of Patent: Nov. 25, 2014

(54) INFORMATION PORTAL BASED ON PARTNER INFORMATION

(75) Inventors: Morgan Jaclyn Gregory, Vancouver (CA); Adam Charles Cooper, Vancouver (CA); Disha Al Baqui, Vancouver (CA); Jeffrey Leonard Chop, Vancouver (CA); Geoffrey Ross Mair, Vancouver (CA)

(73) Assignee: BMC Software Acquisition, L.L.C., Houston, TX (US)

( * ) Notice: Subject to any disclaimer, the term of this patent is extended or adjusted under 35 U.S.C. 154(b) by 725 days.

(21) Appl. No.: 12/684,036

(22) Filed: Jan. 7, 2010

Related U.S. Application Data

(60) Provisional application No. 61/143,068, filed on Jan. 7, 2009.

(51) Int. Cl.
   *G06F 15/16* (2006.01)
(52) U.S. Cl.
   USPC .......................................... 709/205; 709/223
(58) Field of Classification Search
   CPC .............................. G06Q 50/01; G06Q 10/107
   USPC .......... 709/204–205, 223–224, 203, 217–219
   See application file for complete search history.

(56) References Cited

U.S. PATENT DOCUMENTS

| | | | |
|---|---|---|---|
| 8,412,582 B1* | 4/2013 | Darwin et al. | 705/26.1 |
| 2002/0095387 A1* | 7/2002 | Sosa et al. | 705/65 |
| 2005/0174975 A1* | 8/2005 | Mgrdechian et al. | 370/338 |
| 2008/0098062 A1* | 4/2008 | Balia | 709/203 |
| 2008/0133716 A1* | 6/2008 | Rao et al. | 709/220 |
| 2009/0276305 A1* | 11/2009 | Clopp | 705/14.16 |
| 2009/0299802 A1* | 12/2009 | Brennan | 705/8 |

* cited by examiner

*Primary Examiner* — Philip B Tran

(57) ABSTRACT

Systems, methods, and interfaces are provided for sharing information. Specifically, the present application is directed toward an environment for facilitating the exchange of information between users associated with specific partner network components. Users are granted access to such specific partner networks through a content management system in accordance with each user's affiliation with one or more organizations. The content management system can generate specific information portals accessible by individual users based their organizational associations.

20 Claims, 8 Drawing Sheets

INFORMATION PORTAL BASED ON PARTNER INFORMATION

CROSS-REFERENCE TO RELATED APPLICATION

This application claims the benefit of U.S. Provisional Patent Application No. 61/143,068, entitled "INFORMATION PORTAL BASED ON PARTNER INFORMATION," filed on Jan. 7, 2009, the entirety of which is incorporated herein by reference.

BACKGROUND

Generally described, computing devices and communication networks facilitate the collection and exchange of information. In a common application, computing devices, such as personal computing devices, can utilize a wide area communication network, generally referred to as the Internet, to access content or other data from other computing devices associated with content providing entities. The type of content exchanged between the computing devices can vary according to the specific design/function of the computing device and the type of content provided by the content providing entity.

Users can request data from a content providing entity that is delivered to one or more computing devices in a relatively "real time" basis. For example, users can request content from a network resource (e.g., a Web site) for immediate rendering on a computing device display screen or they can request the immediate transfer of content, such as a document or data file, from a network resource or Web service for storage on the computing device. In another example, users can transmit a request, or initiate a transaction, that results in the downloading or streaming of content to a computing device. Typically, the content providing entity would initiate such a transfer upon receipt of the request from the computing device.

Individual users can identify appropriate content providing entities in a number of ways. In one aspect, users can conduct searches via the communication network or other resources to identify appropriate content providing entities and initiate content requests. Depending on the type of content providing entity involved, the results of such user initiated searches can vary. For example, a user may have difficulty identifying content providers that can provide specific content or to select from a group of content providers that are known to provide specified content. Similarly, content providers/content publishers may have difficulty identifying users interested in consuming content or otherwise making the content known to potential consumers.

Even if content providing entities and content consumers are known to one another, individual users, and content providing entities may be required to establish some form of relationship in order to exchange information. With regard to information exchanged between two individuals, the individuals may be establish an "online" relationship or confirm a relationship prior to exchanging information. An example of such embodiment corresponds to social network Web sites, in which individual users are often required to establish or confirm a relationship in order to access information. With regard to information exchanged between organizations, each organization may wish to exchange different levels of information according to organizational affiliations or according to hierarchies/status within an identified organization. Accordingly, such approaches can become inefficient for facilitating the exchange of information between a user and a content providing entity based on the user's affiliation with an organization, such as a corporation.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Generally described, the present application is directed to an environment for sharing information. Specifically, the present application is directed toward an environment for facilitating the exchange of information between users associated with specific partner networks. Illustratively, users are granted access to such specific partner networks in accordance with each user's affiliation with one or more organizations. In accordance with an illustrative embodiment, the content management system facilitates information exchange by the generation of user interfaces accessible by a user, generally referred to as information portals. Thus, the content management system can generate specific information portals accessible by individual users based their organizational associations.

Illustratively, the information portals display information generated by members of a provider partner network for users associated with consumer partner networks. As described above, access to the information in information portals is made available to individual users according to their affiliation with one or more specific partner networks. Specifically, individual provider partner networks can establish information relationships within an information portal. The information relationships allow the provider partner networks to grant access to at least a subset of information available via the information portal. In one aspect, access to the information can be limited to at least a subsegment of users affiliated with an authorized consumer partner network. The subsets of information made available to such subsegment of users can be generally referred to as a partner program.

Users affiliated with the authorized consumer partner network can then gain access to the partner program by virtue of their affiliation. Specifically, individual user access rights, or other permissions, are managed, at least in part, in accordance with the access rights/other permissions attributed to the identified affiliated partner network. Although the present application will be described with regard to specific system configurations, system components, illustrative interaction, and illustrative user interfaces, one skilled in the relevant art will appreciate that the embodiments disclosed are illustrative in nature and should not be construed as limiting.

Figure 1:
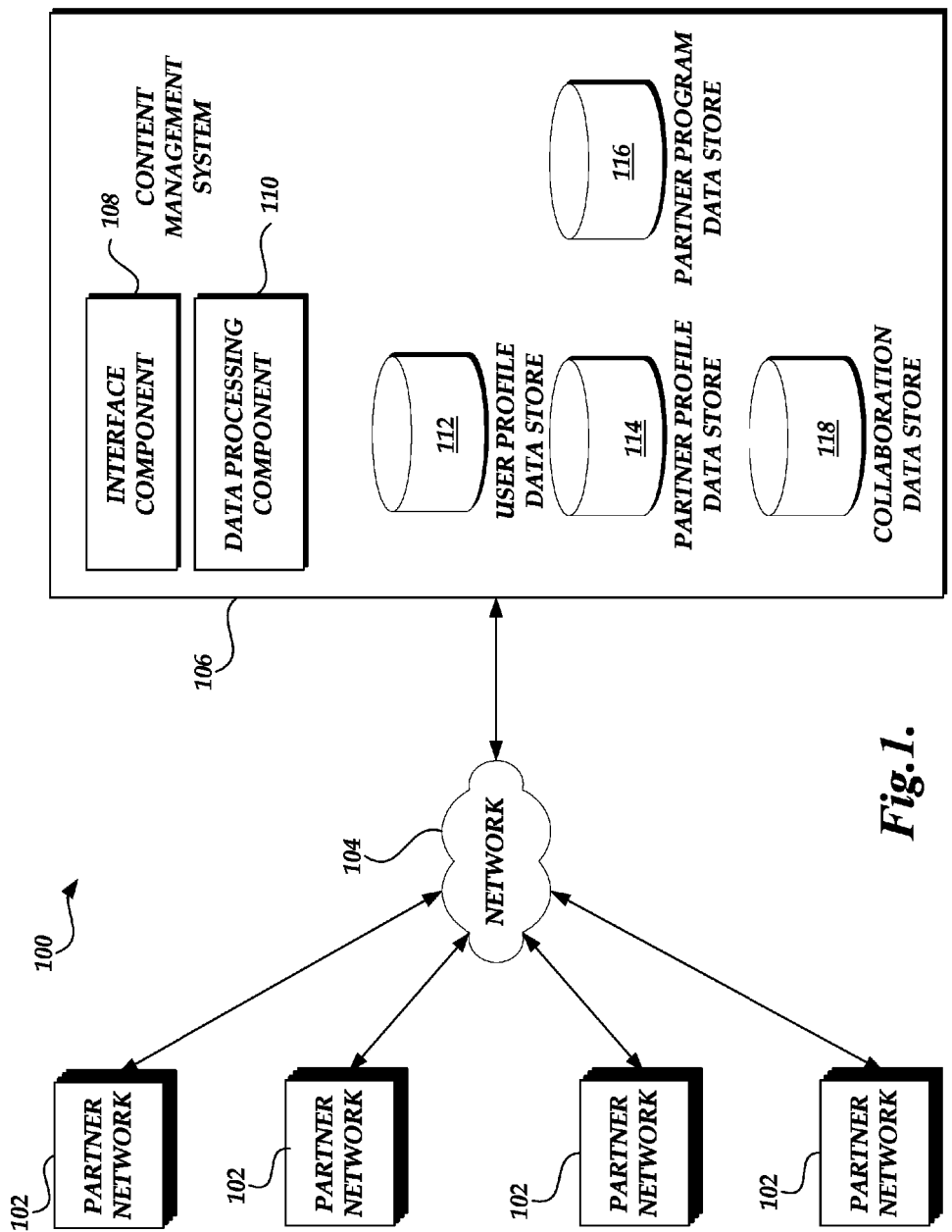
FIG. 1 is a block diagram illustrative of a content management environment 100 for use in facilitating the sharing of content between devices associated with partner networks.

FIG. 1 is a block diagram illustrative of a content management environment 100 for facilitating the sharing of content between devices associated with partner networks. As illustrated in FIG. 1, the content management environment 100 includes a number of partner network components 102. As will be described below, each partner network component 102 logically corresponds to one or more users that can access information via a computing device. In an illustrative environment, the partner network components 102 can exchange information via communication network 104, such as the Internet. However, the communication network 104 can correspond to any one of a variety of local communication networks or wide area communication networks including both private and public communication networks. While individual users may be logically associated with one or more partner networks, such individual users may be remote from a physical network. For example, individual users can be affiliated with specific partner network components 102 without utilizing any of the same physical communication network components or communication network service providers. Additionally, a particular partner network component 102 may not correspond to any particular physical network of computing devices. Rather, at least some partner network components 102 can relate to logical grouping of individual computing devices without any relation to the physical configuration or physical communication networking of the logically grouped computing devices.

With continued reference to FIG. 1, the content management environment 100 includes a content management system 106 for processing information between partner network components 102. The content management system 106 includes an interface component 108 for obtaining information from users in each of the partner network components 102. The content management system 106 also includes a data processing component 110 for processing information request from users and generating specific information portals corresponding to the configuration associated with the user by nature of an affiliation to a specific partner network component 102.

The content management system 106 can utilize a user profile data store 112 for maintaining individual user profiles. The content management system can also include a partner profile data store 114 for maintaining partner profiles that will be applied to each user, at least in part, based on their affiliation with the partner network component 102. The content management system 106 can further include a partner program data store 116 for maintaining information generated by specific partner network components 102 and to be shared with other partner network component 102. Still further, the content management system 106 includes a collaboration data store 118 for maintaining information related to collaborations between users within a single partner network component 102, or between users of different partner network components 102.

One skilled in the relevant art will appreciate that the data stores illustrated in FIG. 1 may be maintained in a single data store or distributed among several data stores. Additionally, one or more of the data stores may be implemented as Web services accessible via the communication network, such as via an Application Programming Interface ("API"). Still further, as will be explained in greater detail below, the data stores 112-118 can be implemented in accordance with multi-tenant embodiments. In such embodiments, partner program data may be collectively stored/maintained in the data stores for a particular user or partner program component 102. At the same time, different selections of the partner program data may be made available depending on the particular affiliations/environments utilized by the user to access the partner program data. Additionally, although the content management system 106 is illustrated as a grouping of components and data stores, one skilled in the relevant art will appreciate that the above is merely one illustrative example to which the disclosed subject matter is not limited.

Figure 2A:
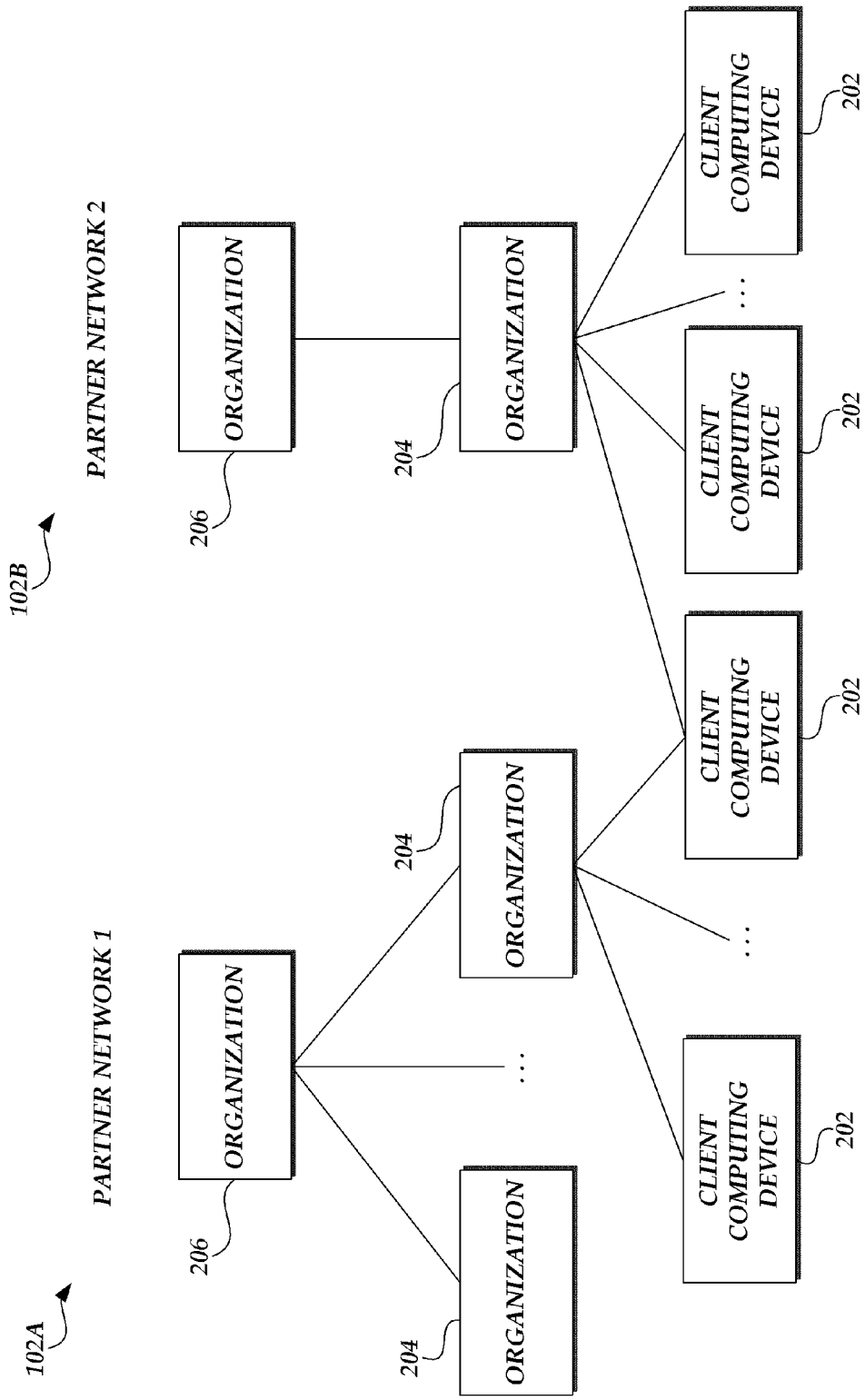
FIGS. 2A and 2B are block diagrams of illustrative partner networks.
Figure 2B:
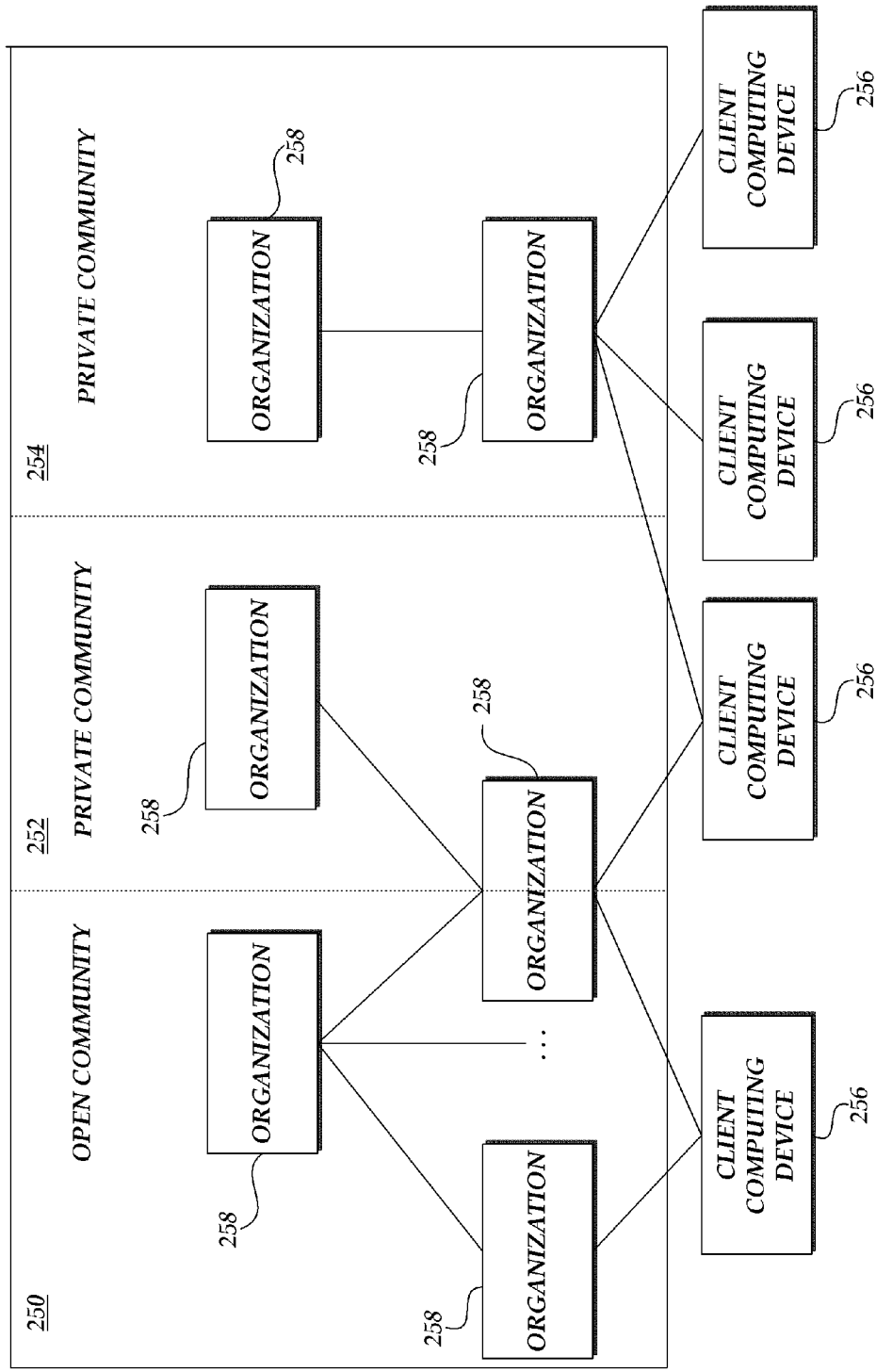

With reference now to FIGS. 2A and 2B, block diagrams of interactions or relationships between illustrative partner network components 102 (FIG. 1) for utilization within the content management system 106 (FIG. 1) will be described. As illustrated in FIG. 2A, individual users may be associated (either physically or through a network connection) with a computing device 202. The computing devices 202 utilized by the individual users of each partner network can correspond to a wide variety of devices or components that are capable of initiating, receiving or facilitating communications over a communication network including, but not limited to, personal computing devices, electronic book readers, hand held computing devices, integrated components for inclusion in computing devices, consumer electronics, appliances, electronic devices for inclusion in vehicles or machinery, mobile telephones, modems, personal digital assistants, laptop computers, gaming devices, and the like.

Based on organizational criteria, the users are eventually associated with one or more partner network components, illustratively partner network components 102A and 102B. The organizational criteria can be based on employment criteria, subscriptions, inferential criteria, and the like. To determine, the partner network component 102 affiliations, and as illustrated in FIG. 2A, each computing device 202 is affiliated at a first level with one or more organizations 204. In turn, each organization 202 can further correspond to additional levels of organizational criteria, such as organizations 204. Accordingly, individual users can be affiliated with a number of organizational entities according to vertical hierarchies. Although partner network components 102A and 102B are illustrated with regard to a three-tiered organizational hierarchy, one skilled in the relevant art will appreciate that a partner network component 102 may have one or more hierarchies and that each partner network component 102 may have different organization structures or utilize different organizational criteria to define organizational hierarchies.

Turning now to FIG. 2B, in addition to classification or affiliation of users to one or more organizations, in an illustrative embodiment, provider partner network component 102 information may be provided to users affiliated with one or more organizations with varying scope. Specifically, in an illustrative embodiment, partner network information may be characterized into one or more logical networks based on classifications of users. For example, a "public" network may be defined for the general population of users associated with a particular partner network component 102 or all users of the content management system 106. In another example, a "private" network may be defined that limits users according to their affiliated partner network component 102. Additionally, the "private" networks can further subdivide users within a partner network component 102 (e.g., "employees" vs. "executives" vs. "top management).

As illustrated in FIG. 2B, a particular provider partner network component 102 has defined three logical networks 250, 252, 254. Similar to FIG. 2A, each computing device 256 is affiliated with one or more organizations 258. The first level organizations 258 can further be affiliated in accordance with a hierarchical structure. With regard to logical network 250, the "public" network, all users affiliated with a partner network component 120 may have access. With regard to logical networks 252 and 254, a more limited subset of users would have access to the partner information. In one embodiment, each user may be forced into a single user characterization (e.g., either "employee," "executive," or "top management"). In another embodiment, users may have multiple characterizations (e.g., all "top management" are "executives" and "employees"; all "executives" are also "employees"; and everyone is an "employee"). Thus, a specific user may access partner information in different ways or access different partner information depending on the user characterization.

Figure 3:
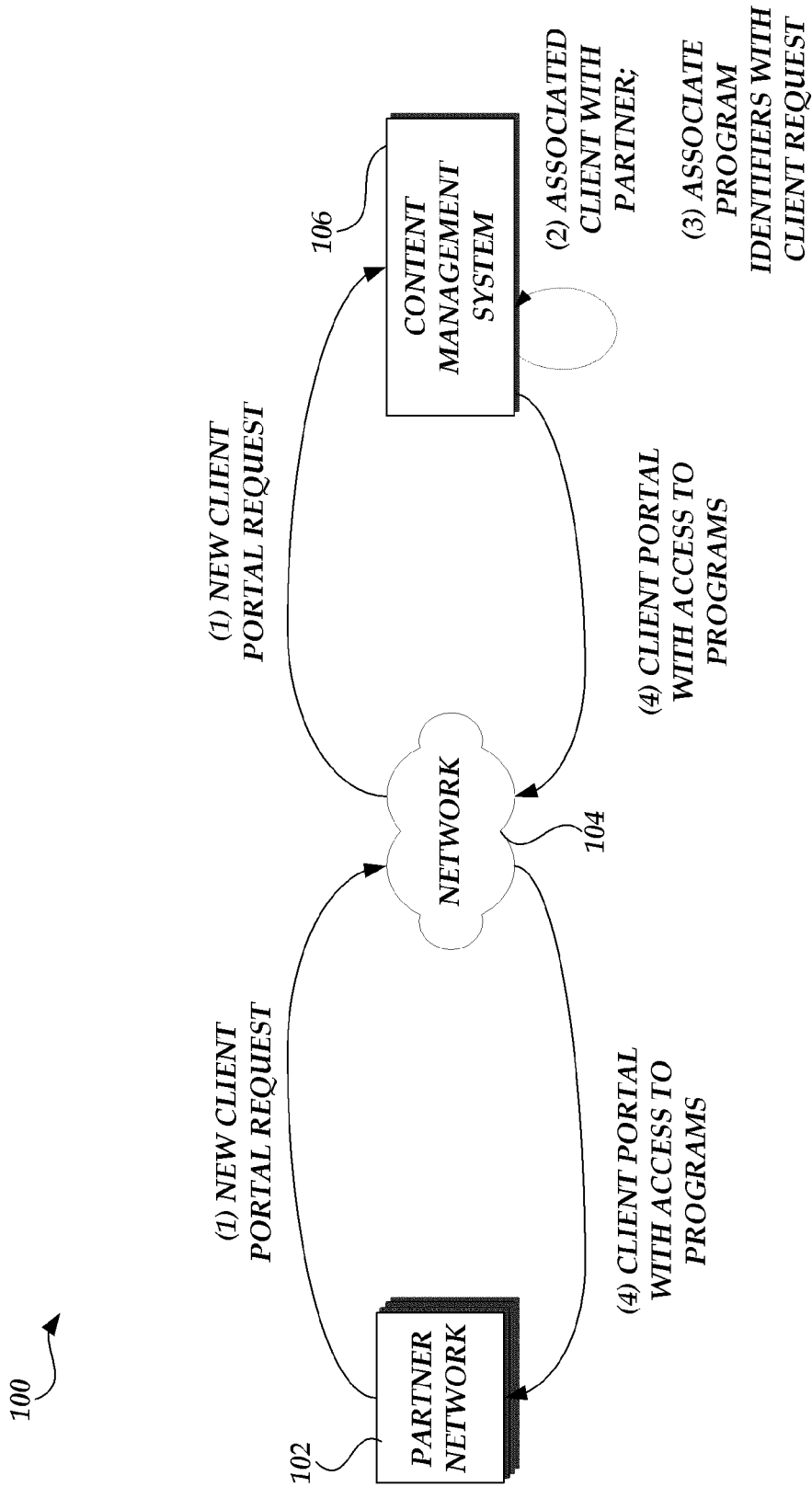
FIG. 3 is a block diagram of the content management environment 100 of FIG. 1 illustrating various embodiments for the sharing of content between devices associated with partner networks via the generation of an information portal.

With reference now to FIG. 3, a block diagram of the content management environment 100 of FIG. 1 illustrating the sharing of content between devices associated with the partner network component 102 will be described. As illustrated in FIG. 3, a user associated with a partner network component 102 generates a new client portal request which is transmitted over the communication network 104 to the content management system 106. Illustratively, the new client portal request can be facilitated by access to a network resource, such as a Web site, provided by the content management system 106. An illustrative network resource will be described below. The content management system 106 processes the new client portal requires by associating the client with at least one partner network component 102.

Based on the association of at least one partner network component 102, the content management system 106 then associates partner program identifiers with the particular client request. Specifically, the content management system 106 determines the program identifiers authorized for the partner network(s) associated with the user. Based on this association, the content management system 106 then provides the user (through a client computing device) with an information portal that provides the user access to each of the programs that have been associated with the user. For example, the content management system 106 can cause the generation of user interfaces on a client computing device associated with the requesting user.

In an illustrative embodiment, the content management system 106 can filter the identified program information according to the partner network profile of the associated partner network components 102. In one aspect, the content management system 106 can filter identified program information according to organizational affiliation information associated with a user. For example, assume a partner network component 102 generates a partner program that includes first and second portions of content (e.g., data). The partner network can specify criteria, such as business rules, such that a specific partner network component 102 may be limited in the amount of information they can access from a particular partner program. For example, if the criteria specify that a particular partner network component 102 may only have access to the first portion of information, all users associated with that specific partner network component 102 would also be limited in the amount of information they can access (e.g., the first portion of the data). Accordingly, the content management system 106 would filter, or otherwise prevent, the second portion of the data from the information portals generated to user's affiliated with the specific partner network.

In another aspect, the content management system 106 can further filter the identified program information according to a second type of organizational affiliation information associated with a user or a partner network component 102 affiliated with a user. With reference to the previous example regarding the partner program having first and second portions of content, assume that users associated with the partner network component 102 can be characterized as public users, a first level of users and a second level of users. Depending on the characterization of the user or the user's affiliation with the partner network component 102, the user would be further limited as to the amount of accessible information. Accordingly, the content management system 106 would filter, or prevent the display of, content in accordance according to the user characterization. Still further, in some embodiments, the partner network component 102 may allow one or more users to have multiple user characterizations (e.g., a public user and an executive). In this embodiment, the content management system 106 would filter, or otherwise prevent the display of, the content according to the specific user characterization identified by the content management system. For example, an information portal associated with a "public" user would include different or less content that an information portal associated with an "executive" user, even if it was the same user and even in the content management system 106 maintains the entire information portal information for that user in the partner program data store 116 (FIG. 1).

Figure 4:
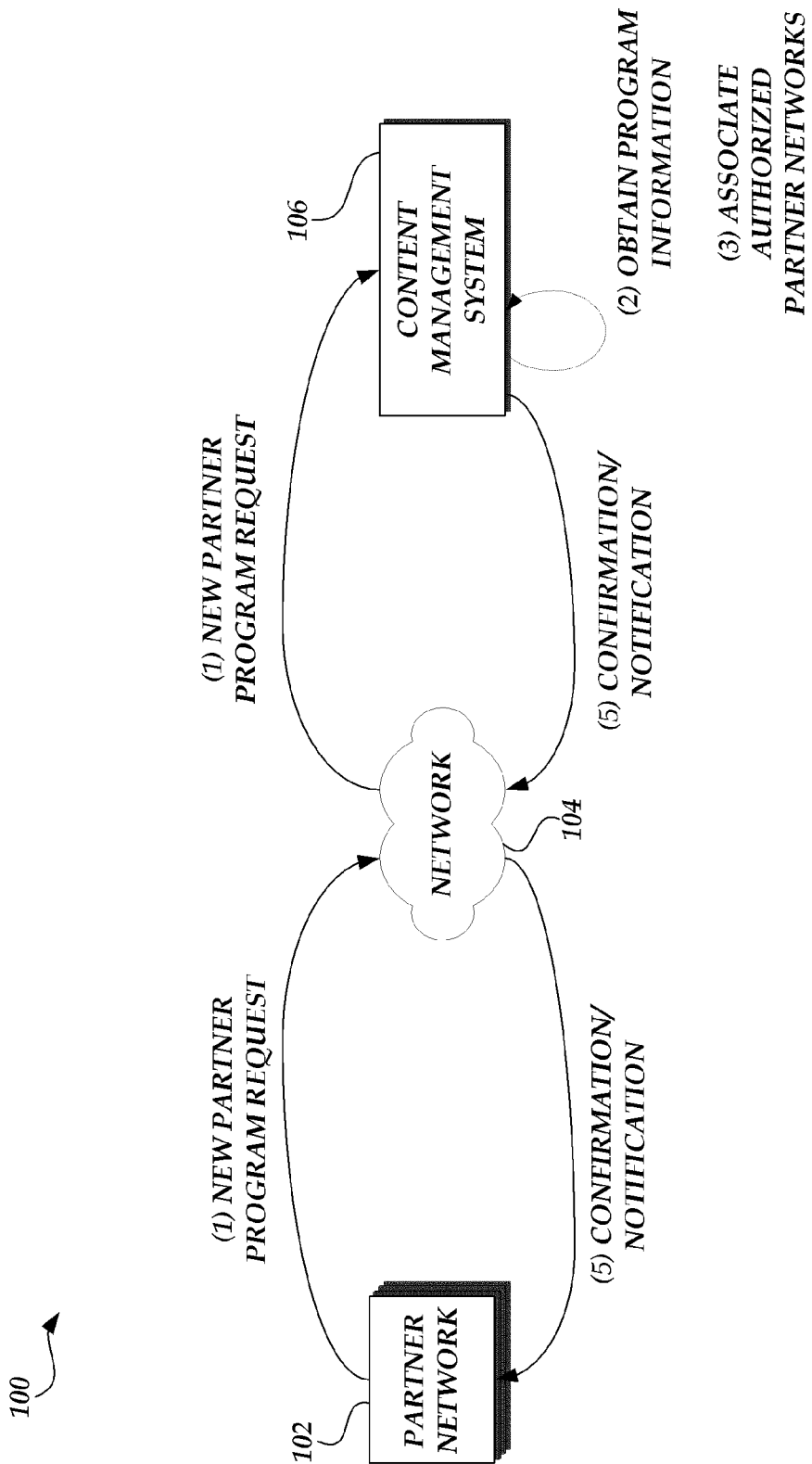
FIG. 4 is a block diagram of the content management environment 100 of FIG. 1 illustrating various embodiments for the creation of programs to be included in an information portal for sharing content between devices associated with partner networks.

With reference now to FIG. 4, a block diagram of the content management environment 100 of FIG. 1 illustrating the creation of partner network programs for inclusion in information portals will be described. As illustrated in FIG. 4, a user associated with a partner network component 102 generates a new partner program request that is transmitted over the communication network 104 to the content management system 106. Illustratively, the new partner program generation request can be facilitated by access to a network resource, such as a Web site, provided by the content management system 106. The content management system 106 processes the new partner program request by obtaining information that will be included in the partner network program. Examples of the type of information that will be included in a new partner program can include, but are not limited to, contact information, descriptive information, and attached documents and files.

After obtaining the information to be included in the program information, the content management system 106 then obtains from the user authorization information. Illustratively, the authorization information relates to the specification of which partner network components 102 may have access to the program information. Additionally the authorization information can also establish that specific authorized partner network components 102 will only be able to access a subset of the program information. Still further, the authorization information can also establish different subsets of program information according to characterization of users affiliated with the specified partner network component 102. As discussed above with regard to FIG. 3, users associated with such partner networks will then be limited as to how much of the program information will be provided via the information portal. Once all the authorization information is gathered, the content management system 106 can then send confirmation or notifications to the user of the partner network component 102 via the communication network 106. Illustratively, the notification can correspond to any one of a variety of notification methods and communication media, including, but not limited to, electronic mail, short message service, multi-media message service, micro-blogs, blogs, and the like.

Figure 5:
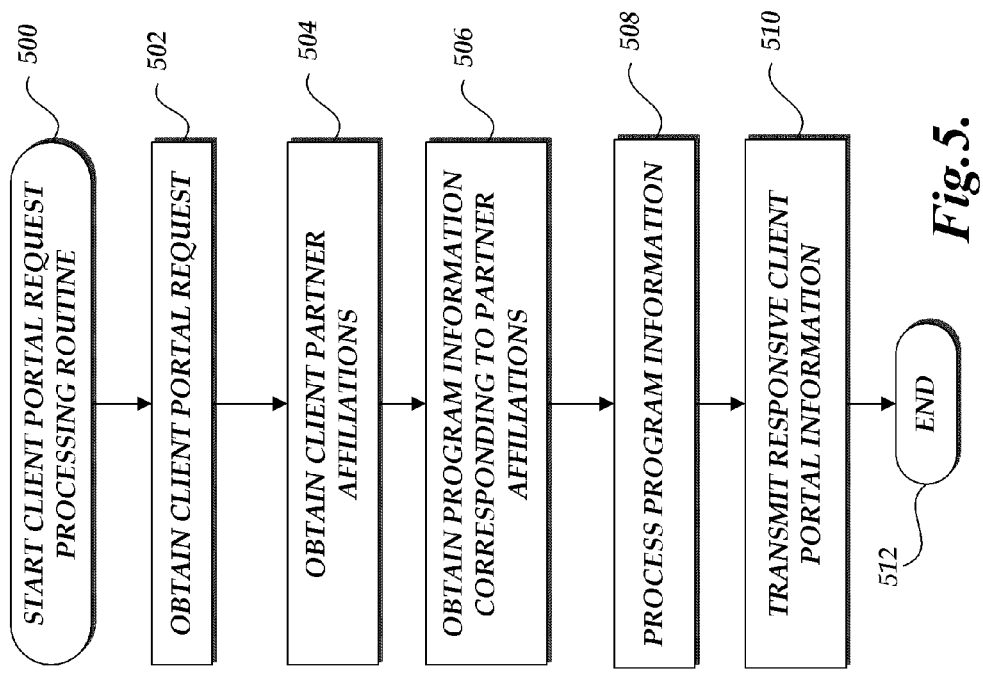
FIG. 5 is a flow diagram of an information portal request processing routine implemented by a content management system.

Turning now to FIG. 5, a client portal request processing routine 500 implemented by a content management system 106 will be described. The client information portal request processing routine 500 begins at block 502 with the content management system obtaining a client portal request. Illustratively, a user associated with the partner network can access a user interface provided by the content management system 106 via the communication network 104. Illustratively, the client information portal request can include user identification information, such as login information, cookies, etc. Such information may be submitted upon approval/specification by the specific user or through the utilization of software application programs, such as a browser software application. At block 504, based on the user identification information, the content management system 106 obtains client partner affiliations associated with the client portal request. In one embodiment, the content management system 106 can maintain the partner network affiliations in the user profile data store 112. Accordingly, the content management system 106 can obtain affiliation information based on the user identification information included in the client portal request.

If the partner network affiliation is not readily available, in an illustrative embodiment, the content management system 106 can parse information associated with a particular user to obtain identification information. For example, the content management system 106 can parse a domain name, or host name, from user contact information, such as an email address, to obtain affiliation information. Specifically, in one embodiment, the content management system 106 can maintain a data store, such as a database, of domain names that have been associated with partner network components 102 (e.g., "partner.com," "partner1.com," "partner.net," etc.). Each specific partner network component 102 can register domain names with the content management system 106. Additionally, the content management system 106 can also associate specific domains based on interactions with users known to be affiliated with the partner network component 102, such as through learned behaviors. For example, the content management system 106 can add or remove domains based on interactions with users known to be affiliated with specific partner network components 102.

In another embodiment, the content management system can parse email addresses associated with user (either submitted in the information portal request or obtained otherwise) to identify keywords, such as partial domain names or hostnames. Using the parsed keywords, the content management system can then search a data store of known partner network names or identifiers to match the user with a partner network.

In another embodiment, the content management system utilizes the email address provided, or otherwise associated with the user, to verify the affiliation information. In such an embodiment, upon associating the user with a partner network, the content management system 106 can forward a secure email to the user at the email address having the domain associated with the partner network component 102. The secure email can include a special resource identifier, such as a hyperlink, that accesses a domain provided by the content management system. The resource identifier can include embedded information, such as confirmation codes, expiration codes, etc., to prevent fraud. Additionally, the content management system 106 can require additional confirmation information or other steps via the domain accessed by the resource identifier. Based on accessing the resource identifier in the manner specified, the content management system 106 verifies the association of the user to the partner network component 102. Such secure links can allow the content management system 106 to associate a user to a partner network without require additional activity by the user. Further, the content management system 106 can leverage security procedures or protocols utilized by the partner network components 102 in managing the use of authorized email accounts.

With continued reference to FIG. 5, based on the client partner affiliations obtained from the user profile data store 112 or otherwise obtained by the client management system 106, at block 506, the content management system then obtains the program information available to the user based on the partner affiliations. Illustratively, the content management system 106 may obtain all program information available to all users affiliated with the identified partner program component 102. As previously described, the content management system 106 can then filter applicable program information that is presented to a user via an information portal. At block 508, the content management system processes the program information such that a user can only access the program information via the information portal as allowed by any user of the particular partner network. Additionally, the content management system can also filter the program information based on individual user criteria or based on the identity of the individual user. For example, the content management system 106 can further filter program information depending on a characterization of a user or a user's selection of a particular characterization.

At block 510, the content management system 106 can then transmit responsive client portal information via the communication network. As will be described below, the client information portal can be provided to the user via user interface generated on the user computer. For example, the information portal may be generated via a browser software application. At block 512, the routine 500 terminates.

Figure 6:
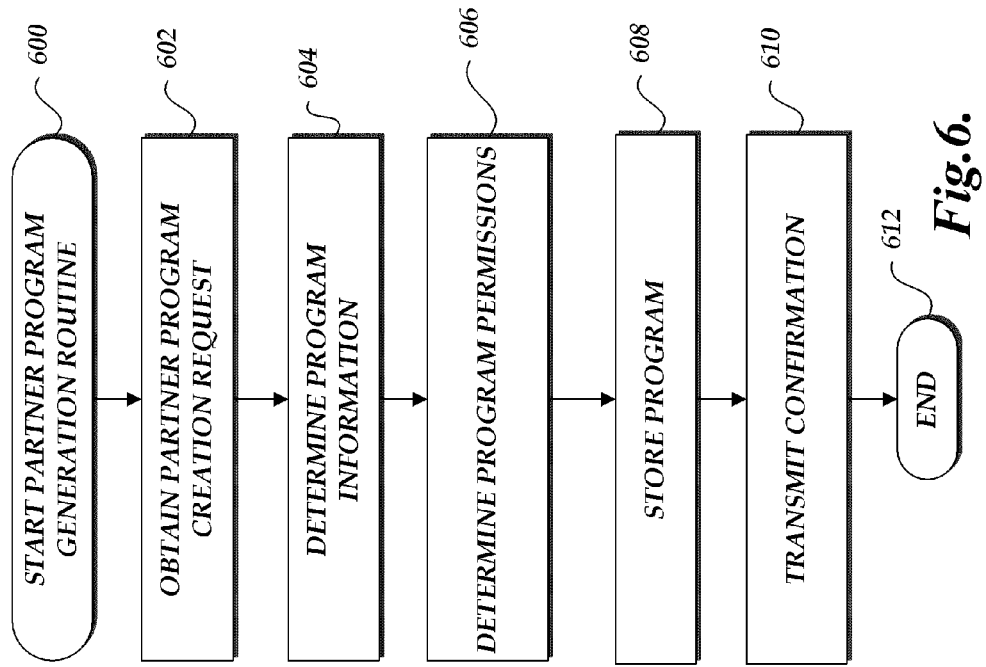
FIG. 6 is a flow diagram of a partner program generation routine implemented by a content management system.

With reference now to FIG. 6, a partner program generation routine 600 implemented by the content management system 106 will be described. At block 602, the content management system 106 obtains the partner program creation request from my user associated with a particular partner network component 102 via the communication network 104. Illustratively, the request may be transmitted by accessing and an interface to be generated on the user client computer.

At block 604, based on the request, the content management system 106 determines, or otherwise identifies, the information associated with the partner program that is to be included in the information portal. As previously described, the program information can include information associated with the partner network (e.g., descriptive information, confidential information, etc.). Additionally, the program information can include additional link information, such as documents, files, multimedia information, and the like.

At block 606, the content management system 106 then determines program permissions for the particular program. In one embodiment the content management system 106 may utilize preconfigured permission information defined according to the partner network component 102 (e.g., default permissions attributed to the partner network component 102 associated with a requesting user). The preconfigured permission information may be stored in a partner network program data store 116 (FIG. 1). Additionally, the content management system 106 may also obtain specific or additional program permissions from the user via a user interface. As previously described, the permission information can define a limited set of information for specific partner network components 102 such that users associated with that specific partner network component 102 can only access a subset of the program information. Additionally, as described above, the user can specify filtering criteria based on individual users, such as criteria based on the characterization of user. At block 608, the content management system 106 stores the program information. Additionally, at block 610, the content management system 106 can optionally transmit a confirmation to the requesting user or according to specified contact information (e.g., a system administrator identified for the partner network component). The store program will then be made available for access by requesting users as described above with regard to FIG. 5. At block 612, the routine 600 terminates.

Figure 7:
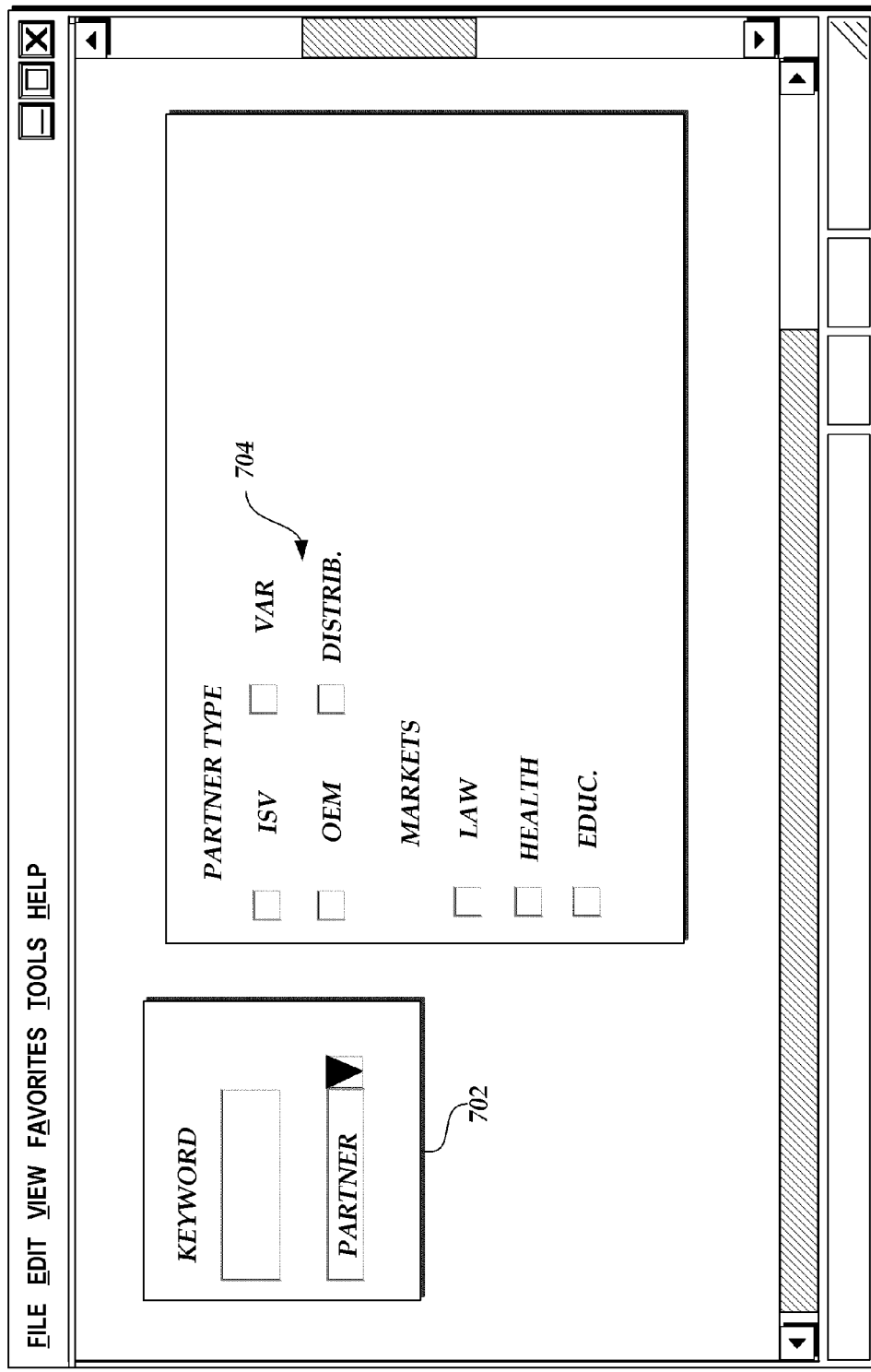
FIG. 7 is a block diagram illustrative of a screen display generated by a client computing device for facilitating the selection of partner networks.

Turning now to FIG. 7, an illustrative screen interface 700 generated by a client computing device for the selection of partner network components 102 will be described. The screen interface 700 is generated on a client machine to facilitate the selection or identification of partner networks by a user. As illustrated in FIG. 7, the screen interface 700 includes a search component 702 for allowing search functionality such that users can enter keyword searches of potential partner network names/identifiers. The screen interface 700 also includes a partner category selection component 704 that facilitates the selection of specific categories of partner network components 102.

By utilizing the screen interface 700, a user associated with one or more partner network can conduct queries to identify other partner networks in which the user may be interested. If so, the user can initiate a relationship between the user's particular partner network components 102 and other partner networks. If accepted, the user (and other individual users affiliated with the same organization) can access partner program information provided by the partner network component 102 via an information portal.

Figure 8:
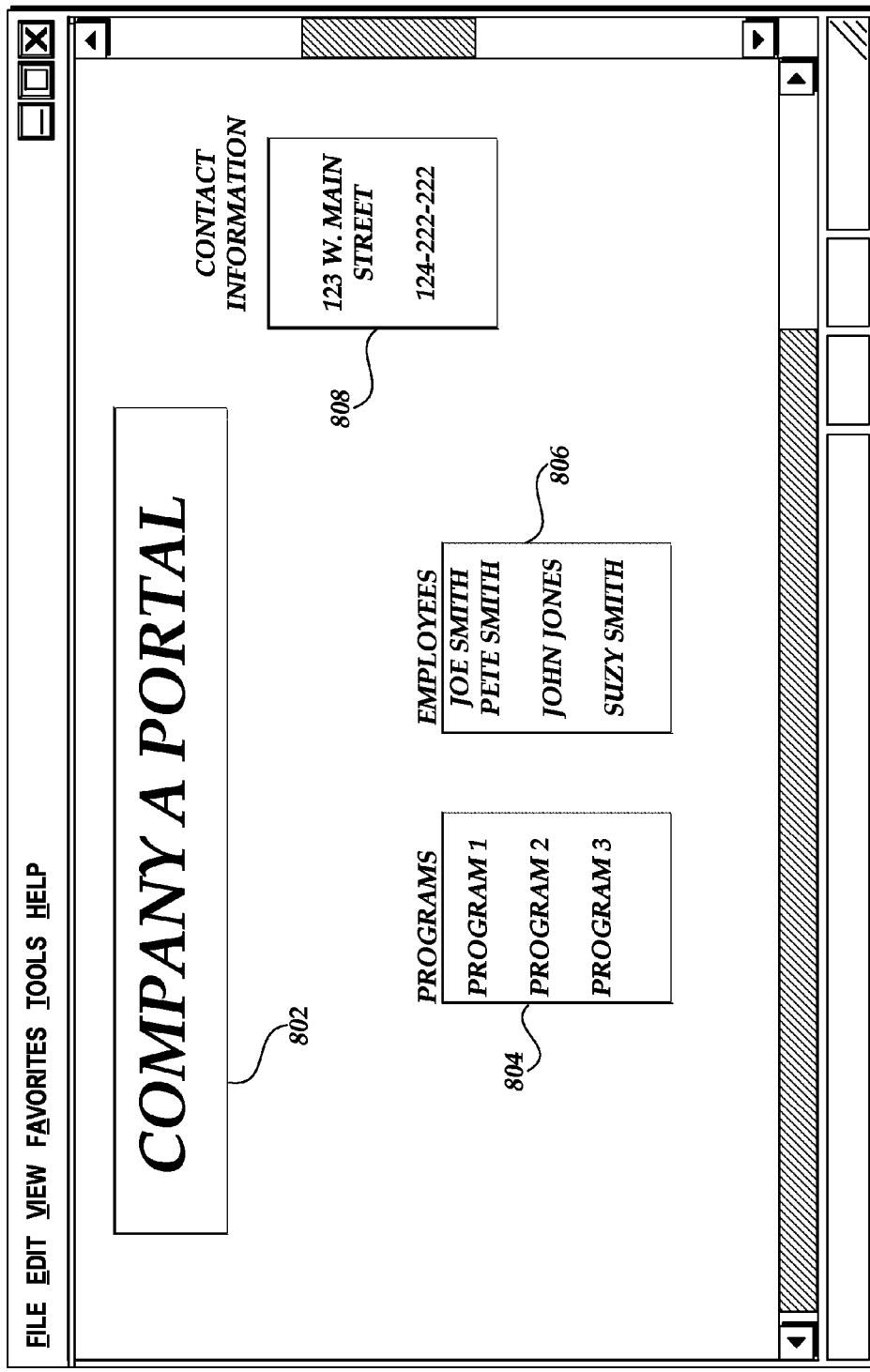
FIG. 8 is a block diagram illustrative of a screen display generated by a client computing device for displaying information portals including one or more programs.

With reference now to FIG. 8, an illustrative screen interface 800 generated by client computing device for presenting an information portal will be described. The screen interface 800 includes a first portion 802 that identifies to the user partner network affiliation information attributed to the user by the content management system 106. For example, the first portion 802 may include the specific identification of the partner network component 102 utilized to determine a user's permissions. The screen interface 800 can include a second portion 804 that identifies the partner network programs provided by other partner networks and available to the user by virtue of their affiliation. The screen interface 800 can also include a third portion 806 that identifies which other members of the partner network have access that program information. For example, in an organization corresponding to a company, the screen interface can identify which employees of the company have accessed, or are currently accessing, the program information available to the user. The screen interface 800 can further include additional information 808 provided by the selected partner network, such as contact information for the particular program, partner networks, or for the company associated with the information portal.

In an illustrative embodiment, the content management system 106 can also facilitate collaborative efforts by the users of partner network components 102. In this embodiment users may generate content to be shared amongst other users of partner network components 102 or within a particular partner network component. The collaborative information, often referred to as a "wiki," can be accessible via the information portal or another interface provided by the content management system. The collaborative information may be stored in the collaborative data store maintained by the content management system 106. Additionally the content management system 106 can further process the collaborative information such that access may be limited to a specific subset of users or such as content generated by particular users is processed and potentially filtered by the content management system 106. As previously described, the collaborative information may be integrated as part of the information portal present to particular user. Alternatively, the collaborative information may be made available to a larger subset of users.

While illustrative embodiments have been disclosed and discussed, one skilled in the relevant art will appreciate that additional or alternative embodiments may be implemented within the spirit and scope of the present disclosure. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components, such as a CD-ROM, DVD-ROM, or network interface. Further, the component and/or data can be included in a single device or distributed in any manner. Accordingly, general purpose computing devices may be configured to implement the processes, algorithms, and methodology of the present disclosure with the processing and/or execution of the various data and/or components described above. Alternatively, some or all of the methods described herein may alternatively be embodied in specialized computer hardware. In addition, the components referred to herein may be implemented in hardware, software, firmware or a combination thereof.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A content management system comprising:

an interface component configured to obtain information from users affiliated with one or more organizations and corresponding to one or more partner network components, the one or more partner network components are configured to provide content, with varying scope to the users based on a corresponding organization being associated with at least one of an open community and a private community;

a data processing component for processing information requests from the users and generating specific information portals for the users corresponding to the configuration associated with the user according to specific partner network component affiliation information associated with a user via the corresponding organization, wherein the generated specific information portals provide access to partner information provided to the partner network component corresponding to the affiliation information by a different partner network component and the corresponding organization such that the information portals provide limited access to partner information based on whether or not the corresponding organization is associated with a private community;

a user profile data store for maintaining individual user profiles;

a partner profile data store for maintaining partner profile information, wherein the partner profile includes specific partner network component affiliation information for partner network components;

a partner program data store for maintaining partner information generated by specific partner network components;

wherein the data processing components filters at least a portion of the partner information included in the generated specific information portal based on specific partner network component affiliation information associated with the information obtained from a user, the specific partner network component affiliation information including at least one of affiliation with one or more partner network components and user characterizations associated within an affiliated partner network component.

2. The content management system of claim 1, wherein the information from users corresponding to one or more partner network components includes a request for an information portal.

3. The content management system of claim 2, wherein the request includes affiliation information to be utilized in the generation of the specific information portal.

4. The content management system of claim 2, wherein the data processing component obtains the specific partner network component affiliation information from domain information associated with a user electronic mail address.

5. The content management system of claim 1, wherein the partner program data store is stored in accordance with a multi-tenant storage model.

6. The content management system of claim 1, wherein the user characterization includes at least one of a public network and a private network.

7. The content management system of claim 1, wherein at least one user is associated with two or more organizations.

8. The content management system of claim 1, wherein at least one user is associated with multiple user characterizations and wherein the specific information portal corresponds to a selected user characterization.

9. The content management system of claim 1 further comprising a collaboration data store for maintaining information related to collaborations between users.

10. The content management system of claim 9, wherein the collaborations correspond to collaborations associated with at least one of users within a single partner network component and users of different partner network components.

11. A computer-implemented method for managing content comprising:

obtaining an information portal request from a user affiliated with one or more organizations;

obtaining user affiliation information corresponding to the information portal request, the affiliation information associating the user with a partner network component, the partner network component being one of a plurality of partner network components and configured to provide content, with varying scope to at least one user based on a corresponding organization being associated with at least one of an open community and a private community;

obtaining partner information based on the obtained user affiliation information, wherein the partner information corresponds to information provided to the partner network component corresponding to the affiliation information by a different partner network component;

processing the partner information based on the user affiliation information;

causing the generation of an information portal including to be accessed by the user via the corresponding organization, wherein information portal includes the processed partner information such that the information portal provides limited access to partner information based on whether or not the corresponding organization is associated with a private community;

wherein the method is implemented in a computer system including one or more computing devices.

12. The method as recited in claim 11, wherein obtaining the information portal request includes obtaining a user specification of affiliation information.

13. The method as recited in claim 11 further comprising determining user affiliation information.

14. The method as recited in claim 13, wherein determining user affiliation information includes determining user affiliation information from at least a domain associated with an electronic mail address of the user.

15. The method as recited in claim 11, wherein processing the partner information includes filtering the partner information based on affiliations with one or more specific partner network components.

16. The method as recited in claim 11, wherein processing the partner information includes filtering the partner information based user characterizations of users associated with one or more specific partner network components.

17. A computer-implemented method for managing content comprising:

obtaining an information portal request from a user affiliated with one or more organizations;

obtaining user affiliation information corresponding to the information portal request;

filtering partner information based on user affiliation information, wherein filtering is based on at least a selection of one or more specific partner network components associated with the user and one or more user characterizations from selected specific network components, wherein the partner information corresponds to information provided to the partner network component corresponding to the affiliation information by a different partner network component, the one or more partner network components being configured to provide content, with varying scope, to the user based on a corresponding organization being associated with at least one of an open community and a private community;

causing the generation of an information portal to be accessed by the user via the corresponding organization, wherein information portal includes the processed partner information such that the information portal provides limited access to partner information based on whether or not the corresponding organization is associated with a private community;

wherein the method is implemented in a computer system including one or more computing devices.

18. The method as recited in claim 17, wherein at least one user is associated with two or more organizations.

19. The method as recited in claim 17, wherein at least one user is associated with multiple user characterizations.

20. The method as recited in claim 17 further comprising storing the partner information in accordance with a multi-tenant storage model.

* * * * *